(12) United States Patent
Arai

(10) Patent No.: US 7,815,340 B2
(45) Date of Patent: Oct. 19, 2010

(54) OPTICAL ELEMENT AND PROJECTION-TYPE IMAGE DISPLAY DEVICE

(75) Inventor: Kazuhiro Arai, Daito (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 273 days.

(21) Appl. No.: 12/207,630

(22) Filed: Sep. 10, 2008

(65) Prior Publication Data

US 2009/0086345 A1 Apr. 2, 2009

(30) Foreign Application Priority Data

Sep. 27, 2007 (JP) ............................. 2007-251773

(51) Int. Cl.
*F21V 9/00* (2006.01)

(52) U.S. Cl. ........................ 362/293; 362/245; 359/839

(58) Field of Classification Search ................. 362/235, 362/245, 293; 359/839
See application file for complete search history.

(56) References Cited

U.S. PATENT DOCUMENTS 5,758,956 A * 6/1998 Bornhorst et al. ........... 362/293

6,667,095 B2 * 12/2003 Wheatley et al. ............ 359/839

FOREIGN PATENT DOCUMENTS

JP 2001-83636 A 3/2001

* cited by examiner

*Primary Examiner*—Stephen F Husar
(74) *Attorney, Agent, or Firm*—Marvin A. Molsenbocker; Mots Law, PLLC

(57) ABSTRACT

Provided is an optical element (dichroic mirror) including a mirror surface transmitting a part of an incident light beam therethrough and reflecting the other part of the incident light beam. A target cutoff wavelength, which indicates a boundary wavelength between a wavelength band of a desired transmission light beam and a wavelength band of a desired reflection light beam, is defined, the mirror surface includes a plurality of slant regions, each of the plurality of slant regions includes a reference position at which a cutoff wavelength reference value, which determines whether a light beam having a reference incidence angle should be transmitted or reflected, indicates the target cutoff wavelength, and in each of the plurality of slant regions, the cutoff wavelength reference value is set to be a shorter or a longer wavelength than the target cutoff wavelength, based on a distance from the reference position.

7 Claims, 9 Drawing Sheets

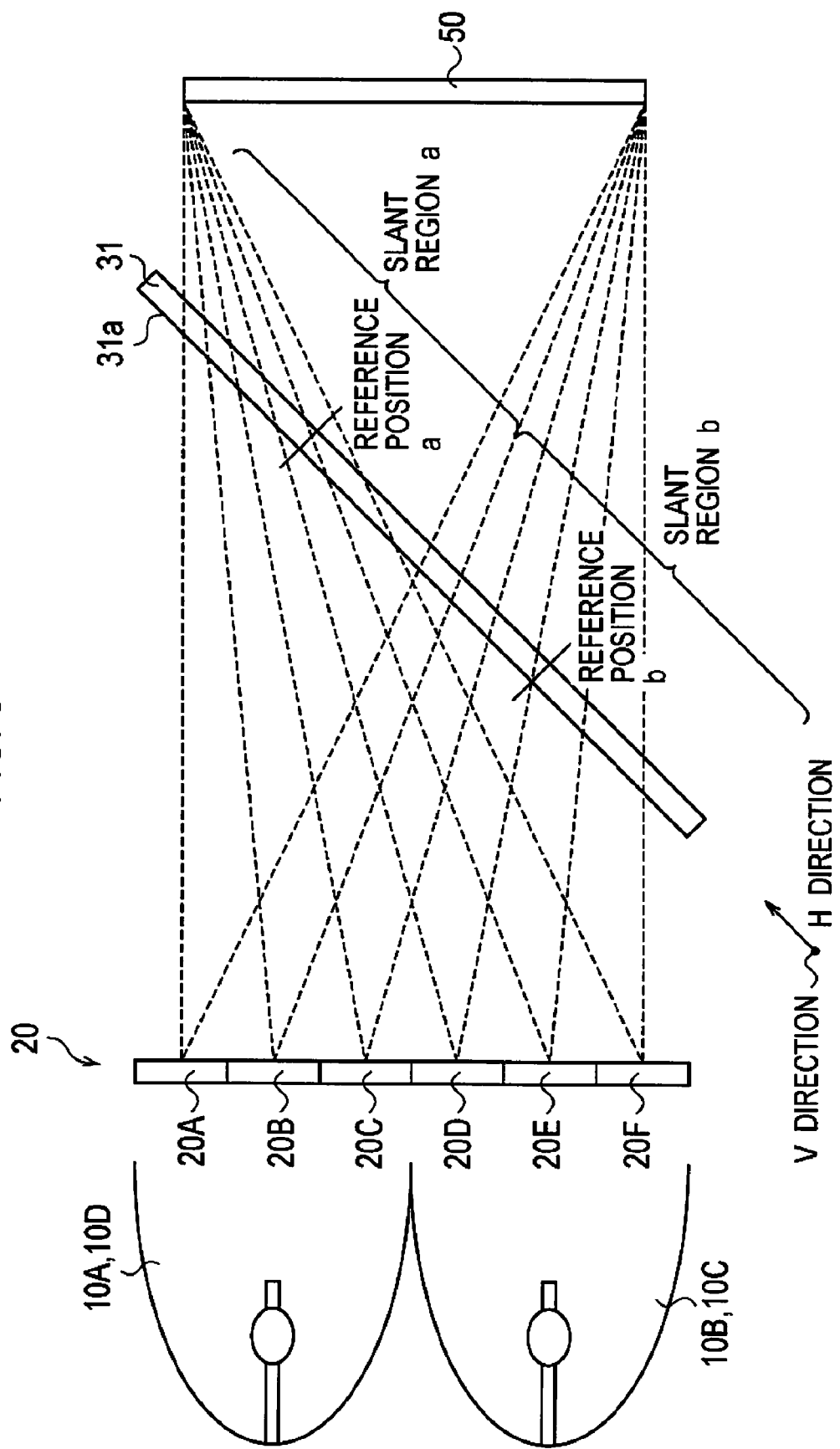

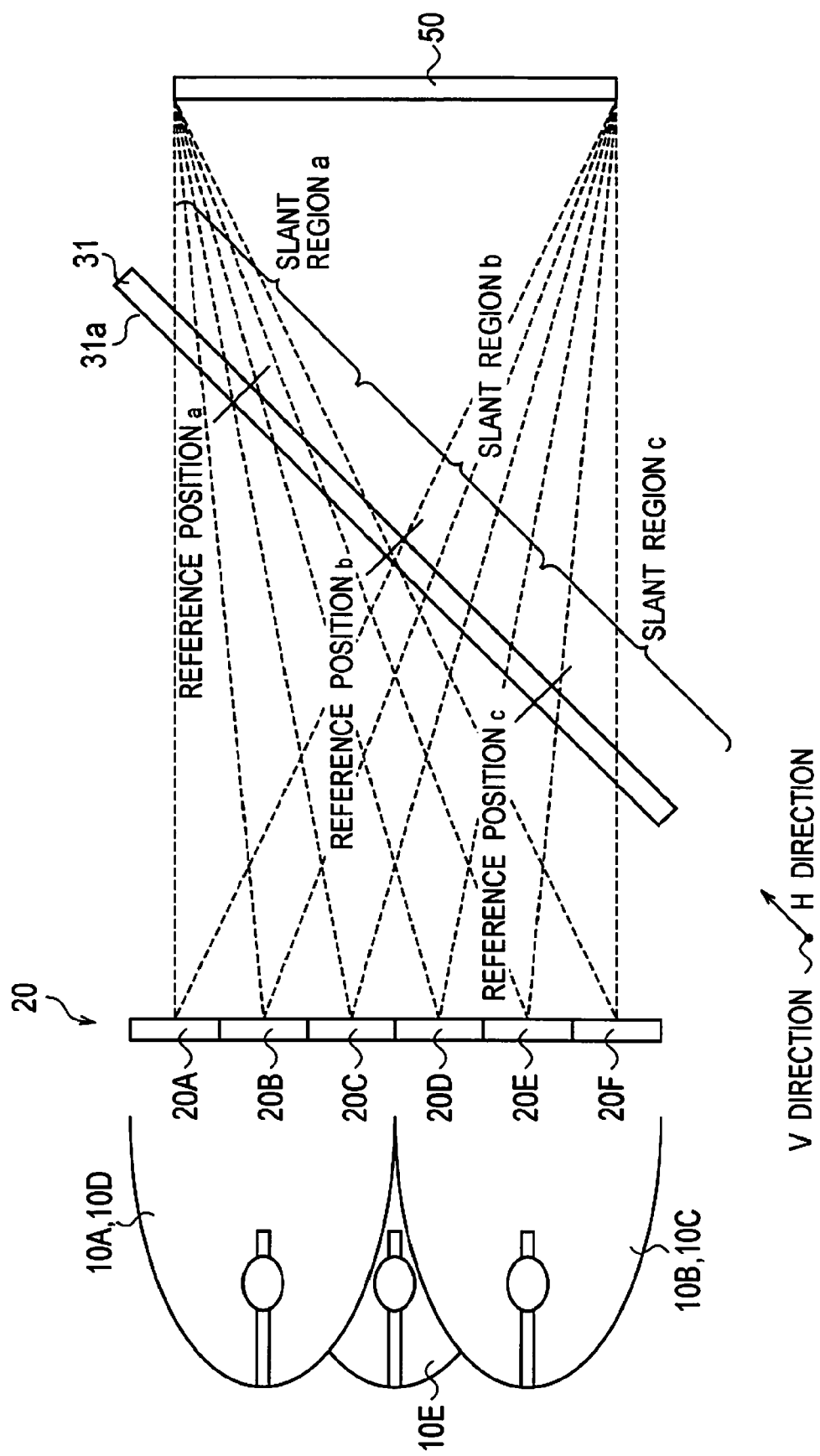

OPTICAL ELEMENT AND PROJECTION-TYPE IMAGE DISPLAY DEVICE

CROSS REFERENCE TO RELATED APPLICATION

This application is based upon and claims the benefit of priority from prior Japanese Patent Application No. 2007-251773, filed on Sep. 27, 2007; the entire contents of which are incorporated herein by reference.

BACKGROUND OF THE INVENTION

1. Field of the Invention

The present invention relates to an optical element that includes a mirror surface transmitting a part of an incident light beam therethrough and reflecting the other part of the incident light beam, and a projection-type image display device including such optical element.

2. Description of the Related Art

An optical element (e.g. dichroic mirror) including a mirror surface transmitting a part of an incident light beam therethrough and reflecting the other part of the incident light beam has been conventionally known. The dichroic mirror is used as a color separator that separates color component light beams from one another, for example. Specifically, the dichroic mirror is used in a projection-type image display device and separates a light beam emitted from a lamp light source unit into color component light beams of a plurality of colors.

Here, the cutoff wavelength of the dichroic mirror shifts in accordance with the incidence angle of a light beam entering the mirror surface. Specifically, when an incidence angle becomes large, the cutoff wavelength shifts towards a short wavelength side. On the other hand, when the incidence angle becomes small, the cutoff wavelength shifts towards a long wavelength side.

In an optical system to which a dichroic mirror is applied, a target cutoff wavelength is defined. The target cutoff wavelength is a boundary wavelength between a wavelength band of a desired transmission light beam and a wavelength band of a desired reflection light beam. A reference position indicates a position at which a cutoff wavelength reference value indicates the target cutoff wavelength. Here, the cutoff wavelength reference value determines whether a light beam having a reference incidence angle (45°, for example) should be transmitted of reflected.

As described above, since the cutoff wavelength shifts in accordance with the incidence angle, it is necessary to set the cutoff wavelength to be close to the target cutoff wavelength for the entire mirror surface. Accordingly, Japanese Patent Application Publication No. 2001-83636 proposes a technique for setting slants with respect to the cutoff wavelength reference value based on a distance from the reference position, on the mirror surface. Specifically, in a region where the incidence angle is larger than the incidence angle at the reference position, i.e.; in a region where an optical path length of a light beam emitted from a lamp light source unit is longer than the optical path length to the reference position, the cutoff wavelength reference value is set to be a longer wavelength than the target cutoff wavelength. On the other hand, in a region where the incidence angle is smaller than the incidence angle at the reference position, i.e.; in a region where the optical path length of the light beam emitted from the lamp light source unit is shorter than the optical path length to the reference position, the cutoff wavelength reference value is set to be a shorter wavelength than the target cutoff wavelength.

Incidentally, a pair of fly-eye lenses each including micro lenses (cells) is known as an optical element that homogenizes the light quantity distribution of a light beam on a light modulation device (such as a liquid crystal panel), the light beam being emitted from a lamp light source unit. Specifically, the light beam emitted from each of the cells provided in the pair of fly-eye lenses is directed onto the entire surface of the light modulation device.

In an optical system including a lamp light source unit, a pair of fly-eye lenses and a dichroic mirror, the pair of fly-eye lenses is provided between the lamp light source unit and the dichroic mirror. Accordingly, the light beam emitted from each of the cells included in the pair of fly-eye lenses is directed onto the mirror surface of the dichroic mirror.

Here, it is common that the cutoff wavelength reference value is monotonously changed in proportion to the distance from the reference position on the mirror surface in the aforementioned dichroic mirror.

In such dichroic mirror, a color purity of each of the color component light beams separated from one another (a transmission light beam and a reflection light beam) can be increased to some extent, but it is desired to further improve the color purities of the transmission light beam and the reflection light beam.

SUMMARY OF THE INVENTION

A first aspect of the invention is summarized as an optical element (such as dichroic mirrors 31 and 32), including a mirror surface (mirror surfaces 31a and 32a) configured to transmit a part of an incident light beam therethrough and to reflect the other part of the incident light beam. In the optical element, a target cutoff wavelength, which indicates a boundary wavelength between a wavelength band of a desired transmission light beam and a wavelength band of a desired reflection light beam, is defined. The mirror surface includes at least a first region and a second region, and each of the first region and the second region includes a reference position at which a cutoff wavelength reference value, which defines whether a light beam having a reference incidence angle should be transmitted or reflected, indicates the target cutoff wavelength. In each of the first region and the second region, the cutoff wavelength reference value at a certain position is set to be a shorter wavelength or a longer wavelength than the target cutoff wavelength, based on a distance from the reference position to the certain position.

According to this aspect, the mirror surface includes at least a first region and a second region, and the cutoff wavelength reference value is set to be a shorter wavelength or a longer wavelength than the target cutoff wavelength, based on a distance from the reference position to the certain position.

Therefore, even when the light beam enters the mirror surface of the optical element at various incidence angles, the cutoff wavelength can be set close to the target cutoff wavelength at each position of the mirror surface. Thereby, the color purities of a transmission light beam and a reflection light beam can be increased as compared with an optical element having the cutoff wavelength reference value changed monotonously in the entire mirror surface.

A second aspect of the invention is summarized as a projection-type image display device, including a lamp light source unit (lamp light source unit 10); and an optical element (such as dichroic mirrors 31 and 32) configured to separate a light beam emitted from the lamp light source unit. The optical element includes a mirror surface (mirror surfaces 31a and 32a) configured to transmit a part of an incident light beam therethrough and to reflect the other part of the incident light beam. In the optical element, a target cutoff wavelength, which indicates a boundary wavelength between a wavelength band of a desired transmission light beam and a wavelength band of a desired reflection light beam, is defined in the optical element. The mirror surface has a slant with respect to an optical axis of the light beam emitted from the lamp light source unit, and includes at least a first region and a second region. Each of the first region and the second region includes a reference position at which a cutoff wavelength reference value, which defines whether a light beam having a reference incidence angle should be transmitted or reflected, indicates the target cutoff wavelength. In each of the first region and the second region, the cutoff wavelength reference value at a certain position is set based on a distance from the reference position to the certain position, and in each of the first region and the second region, the cutoff wavelength reference value is set to be a longer wavelength than the target cutoff wavelength in a region where an optical path length emitted from the lamp light source unit is longer than the optical path length to the reference position, and the cutoff wavelength reference value is set to be a shorter wavelength than the target cutoff wavelength in a region where the optical path length of the light beam emitted from the lamp light source unit is shorter than the optical path length to the reference position.

In the second aspect of the invention, it is preferable that the first region and the second region are defined based on a light quantity distribution of the light beam entering the mirror surface.

In the second aspect of the invention, the lamp light source unit is configured of a plurality of lamp light sources, and the first region and the second region are defined based on a layout of the plurality of lamp light sources.

In the second aspect of the invention, it is preferable that the reference position is defined based on a light quantity distribution of a light beam entering each of the first region and the second region.

In a third aspect of the invention, an optical element includes a mirror surface configured to transmit a part of an incident light beam therethrough and to reflect the other part of the incident light beam. The mirror surface includes at least a first region and a second region, the second region being continuous with the first region. In each of the first region and the second region, a cutoff wavelength reference value is continuously changed between a short wavelength side of a target cutoff wavelength and a long wavelength side of the target cutoff wavelength. The cutoff wavelength reference value defines whether a light beam having a reference incidence angle should be transmitted or reflected, and is discontinuous at a boundary between the first region and the second region.

In a fourth aspect of the invention, a projection-type image display device includes a lamp light source unit; and an optical element configured to separate a light beam emitted from the lamp light source unit. The optical element includes a mirror surface configured to transmit a part of an incident light beam therethrough and to reflect the other part of the incident light beam. The mirror surface has a slant with respect to an optical axis of the light beam emitted from the lamp light source unit, and includes at least a first region and a second region, the second region being continuous with the first region. In each of the first region and the second region, a cutoff wavelength reference value is continuously changed between a short wavelength side of a target cutoff wavelength and a long wavelength side of the target cutoff wavelength. The cutoff wavelength reference value defines whether a light beam having a reference incidence angle should be transmitted or reflected, and is discontinuous at a boundary between the first region and the second region.

BRIEF DESCRIPTION OF THE DRAWINGS

FIG. 5 is a diagram for explaining a layout of the dichroic mirror 31 according to the first embodiment.

FIG. 8 is a diagram for explaining a layout of a dichroic mirror 31 according to the second embodiment.

DETAILED DESCRIPTION OF PREFERRED EMBODIMENTS

Hereinafter, the embodiments of the present invention are described with reference to the accompanying drawings. Note that, in the description of the following drawings, the same or similar parts are denoted by the same or similar symbols.

However, it should be noted that the drawings are diagrammatical and each dimension ratio is different from the actual one. Therefore, the following description should be taken into consideration to judge specific dimensions and the like. Also, a part in which dimensional relationship and ratio are different between drawings is of course included.

First Embodiment (Configuration of Projection-type Image Display Device)

Figure 1:
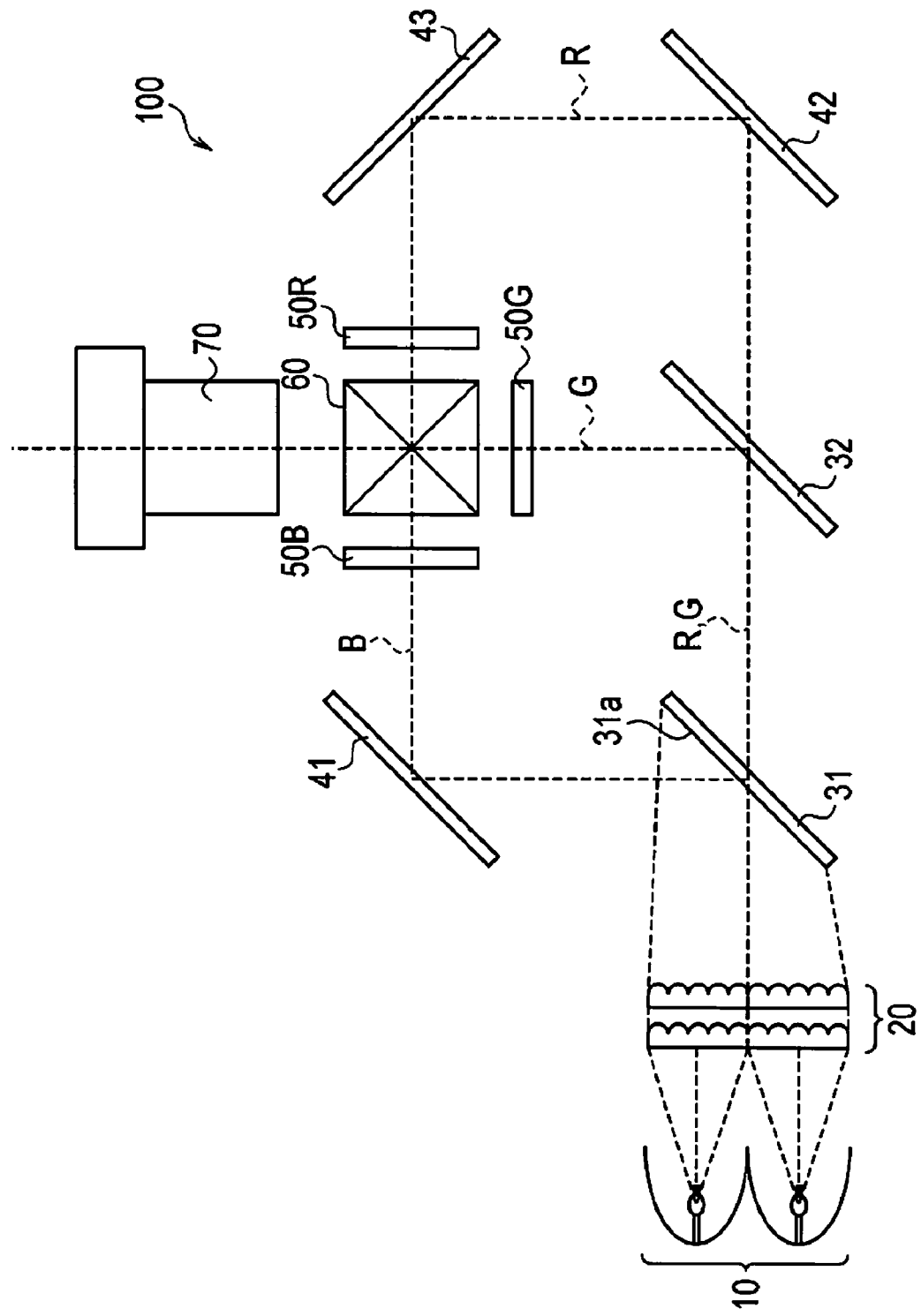
FIG. 1 is a diagram showing a configuration of a projection-type image display device 100 according to a first embodiment.

Hereinafter, a description will be given of a configuration of a projection-type image display device according to a first embodiment with reference to the accompanying drawings. FIG. 1 is a diagram showing a configuration of a projection-type image display device 100 according to the first embodiment. Here, it should be noted that a condenser lens, a relay lens and the like are omitted in FIG. 1.

As shown in FIG. 1, the projection-type image display device 100 includes a lamp light source unit 10, a fly-eye lens unit 20, a plurality of mirrors, a plurality of liquid crystal panels 50, a dichroic prism 60 and a projection lens unit 70. Here, it should be noted that only the components that are necessary for describing embodiments are illustrated in FIG. 1. Accordingly, polarizing plates provided in the plurality of liquid crystal panels 50, a PBS array, which aligns the polarization directions of light beams emitted from the lamp light source unit 10, and the like are omitted in FIG. 1.

The lamp light source unit 10 is a UHP lamp emitting a white light beam, or the like. In the first embodiment, the lamp light source unit 10 is configured of four UHP lamps. Specifically, the projection-type image display device 100 is a multi-lamp type display device including a plurality of lamps.

The fly-eye lens unit 20 is an optical element that homogenizes an illumination distribution of the light beams emitted from the lamp light source unit 10 on each of the plurality of liquid crystal panels 50. Specifically, the fly-eye lens unit 20 is configured of a pair of fly-eye lenses each being configured of a plurality of micro lenses.

The plurality of mirrors includes a dichroic mirror 31, a dichroic mirror 32 and reflection mirrors 41 to 43.

The dichroic mirror 31 is an optical element that includes a mirror surface 31*a* transmitting a part of an incident light beam (a light beam emitted from each of the cells provided in the fly-eye lens unit 20) therethrough, and reflecting the other part of the incident light beam. In the dichroic mirror 31, a target cutoff wavelength is defined. The target cutoff wavelength is a boundary wavelength of a wavelength band of a desired transmission light beam and a wavelength band of a desired reflection light beam.

More specifically, the dichroic mirror 31 transmits a red component light beam R and a green component light beam G therethrough, and reflects a blue component light beam B. In other words, the desired transmission light beam is the red component light beam R and the green component light beam G, and the desired reflection light beam is the blue component light beam B. Accordingly, the target cutoff wavelength is a boundary wavelength between the wavelength band of the green component light beam G and the wavelength band of the blue component light beam B.

The dichroic mirror 31 (the mirror surface 31*a*) has a slant with respect to an optical axis of a light beam emitted from the lamp light source unit 10. In the first embodiment, the dichroic mirror 31 (the mirror surface 31*a*) has a substantially 45° slant with respect to the optical axis of the light beam emitted from the lamp light source unit 10.

In the first embodiment, the blue component light beam B is separated from a light beam emitted from the lamp light source unit 10 before the red component light beam R and the green component light beam G, but the present invention is not limited to this. For example, the red component light beam R may be separated from a light beam emitted from the lamp light source unit 10 before the green component light beam G and the blue component light beam B.

Similarly to the dichroic mirror 31, the dichroic mirror 32 is also an optical element that includes a mirror surface 32*a* transmitting a part of an incident light beam (the light beam having transmitted through the dichroic mirror 31) therethrough and reflecting the other part of the incident light beam. In the dichroic mirror 32, a target cutoff wavelength, which is a boundary wavelength of a wavelength band of a desired transmission light beam and a wavelength band of a desired reflection light beam, is defined.

More specifically, the dichroic mirror 32 transmits the red component light beam R therethrough, and reflects the green component light beam G. In other words, the desired transmission light beam is the red component light beam R, and the desired reflection light beam is the green component light beam G. Accordingly, the target cutoff wavelength is the boundary wavelength between the wavelength band of the red component light beam R and the wavelength band of the green component light beam G.

The dichroic mirror 32 (the mirror surface 32*a*) has a slant with respect to an optical axis of a light beam emitted from the lamp light source unit 10. In the first embodiment, the dichroic mirror 32 (the mirror surface 32*a*) has a substantially 45° slant with respect to the optical axis of the light beam emitted from the lamp light source unit 10.

The reflection mirror 41 reflects the blue component light beam B and then leads the blue component light beam B to the liquid crystal panel 50B. The reflection mirrors 42 and 43 reflect the red component light beam R and then lead the red component light beam R to the liquid crystal panel 50R.

Each of the plurality of liquid crystal panels 50 is a light modulation device that modulates the color component light beams, respectively. More specifically, the liquid crystal panel 50R modulates the red component light beam R, and emits the modulated red component light beam R to the dichroic prism 60. The liquid crystal panel 50G modulates the green component light beam G, and emits the modulated green component light beam G to the dichroic prism 60. The liquid crystal panel 50B modulates the blue component light beam B, and emits the modulated blue component light beam B to the dichroic prism 60.

The dichroic prism 60 combines the color component light beams emitted from each of the plurality of liquid crystal panels 50, and emits the combined light beam (an image light beam), which includes each of the color component light beams, to the projection lens unit 70.

The projection lens unit 70 is configured of a plurality of lenses, and projects the combined light beam (the image light beam) on a screen (not shown).

(Configuration of Optical Element)

Hereinafter, a description will be given of a configuration of the optical element (the dichroic mirror 31 or the dichroic mirror 32) according to the first embodiment with reference to the accompanying drawings. It should be noted that the description will be given for an example of the dichroic mirror 31 as in the following description.

It is to be noted that the dichroic mirror 31 is provided at a position closer to the lamp light source unit 10 than that of the dichroic mirror 32. Accordingly, on the dichroic mirror 31, a region where light beams respectively emitted from the cells provided in the fly-eye lens unit 20 overlap with one another is smaller than that on the dichroic mirror 32.

Figure 2:
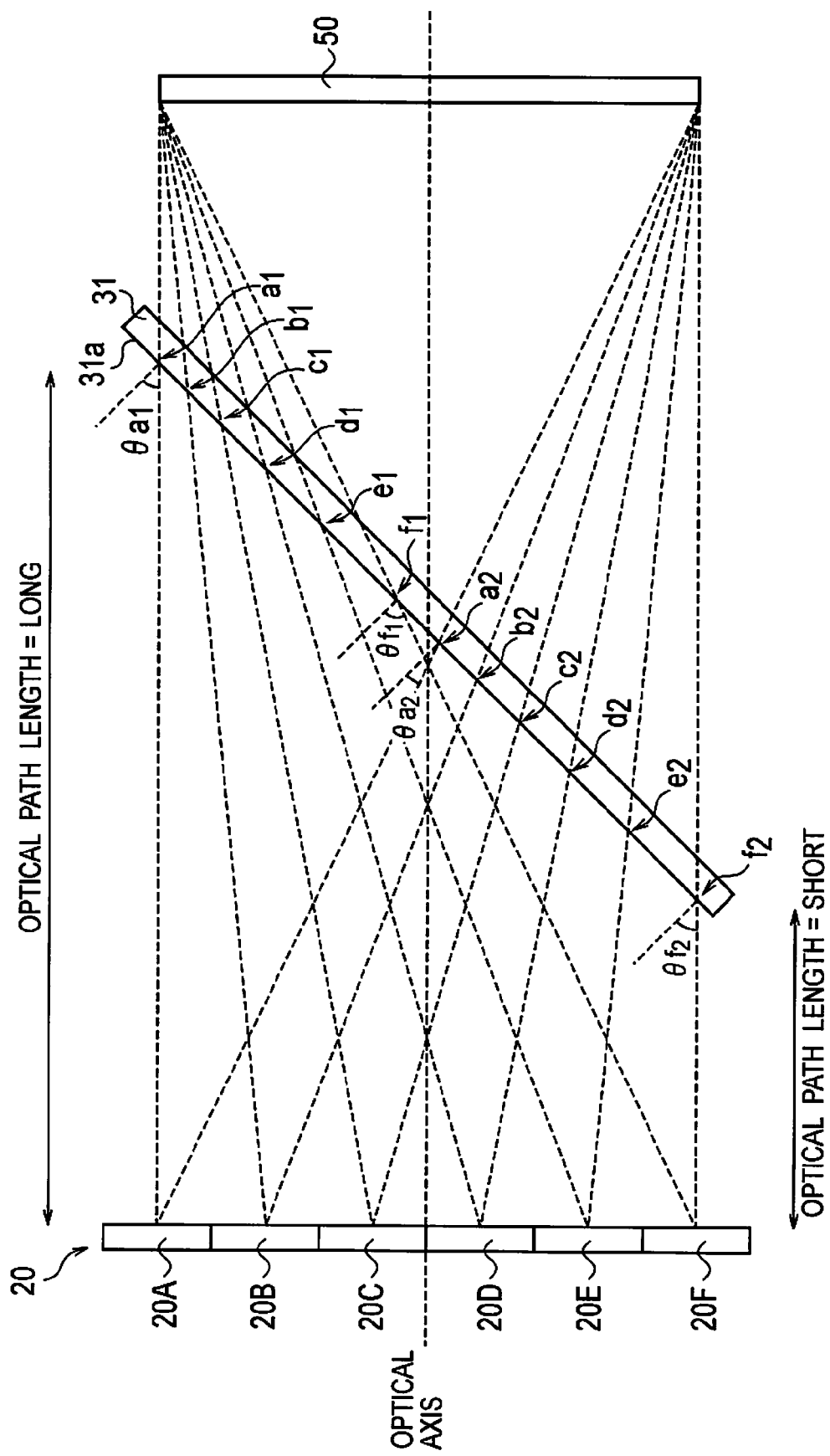
FIG. 2 is a schematic diagram showing a relationship of a fly-eye lens unit 20, a dichroic mirror 31 and a liquid crystal panel 50 according to the first embodiment.

FIG. 2 is a schematic diagram showing a relationship of the fly-eye lens unit 20, the dichroic mirror 31 and one of the plurality of liquid crystal panels 50, of the first embodiment. It should be noted that the configuration of the fly-eye lens unit 20 is simplified in FIG. 2. In addition, the number of cells shown in FIG. 2 is merely an example, and as a matter of course, the number of cells is not limited to this.

As shown in FIG. 2, the fly-eye lens unit 20 includes a plurality of cells (cells 20A to 20F). Each of the plurality of cells is configured of micro lenses provided in the pair of fly-eye lenses.

Here, each of the light beams emitted from each of the plurality of cells is directed onto the entire surface of each of the liquid crystal panel 50. In other words, the light beams respectively emitted from the each of the plurality of cells overlap with one another on each of the liquid crystal panel 50. Thereby, the light quantity distribution of the light beam emitted from the lamp light source unit 10 is homogenized on each of the plurality of liquid crystal panels 50.

On the other hand, the dichroic mirror 31 is provided between the fly-eye lens unit 20 and each of the plurality of liquid crystal panels 50 on an optical path of the light beam emitted from the lamp light source unit 10. Accordingly, the light quantity distribution of the light beam emitted from the lamp light source unit 10 is not homogenized on the mirror surface 31*a* of the dichroic mirror 31.

(Incidence Angle of Incident Light Beam)

Next, an incidence angle of a light beam entering the mirror surface 31a of the dichroic mirror 31 will be described with reference to FIG. 2. Here, description will be given for the incidence angle of the light beam emitted from the each of the plurality of cells.

For example, a light beam A emitted from the cell 20A is considered. An incidence angle $\theta_{a1}$ of the light beam A at a position$_{a1}$ is larger than an incidence angle $\theta_{a2}$ of the light beam A at a position$_{a2}$. Likewise, a light beam F emitted from the cell 20F is considered. An incidence angle $\theta_{f1}$ of the light beam F at a position$_{f1}$ is larger than an incidence angle $\theta_{f2}$ of the light beam F at a position$_{f2}$.

As described above, the incidence angle of the light beam emitted from the each of the plurality of cells is changed in accordance with the position at the mirror surface 31a. In addition, the longer the optical path length of the light beam emitted from the fly-eye lens unit 20 (the lamp light source unit 10) is, the larger the incidence angle of the light beam emitted from the each of the plurality of cells becomes. Note that, as shown in FIG. 2, the optical path length of the light beam emitted from the each of the plurality of cells provided in the fly-eye lens unit 20 indicates the length in the optical axis direction of the light beam emitted from the lamp light source unit 10.

(Light Quantity Distribution of Incident Light Beam)

Figure 3:
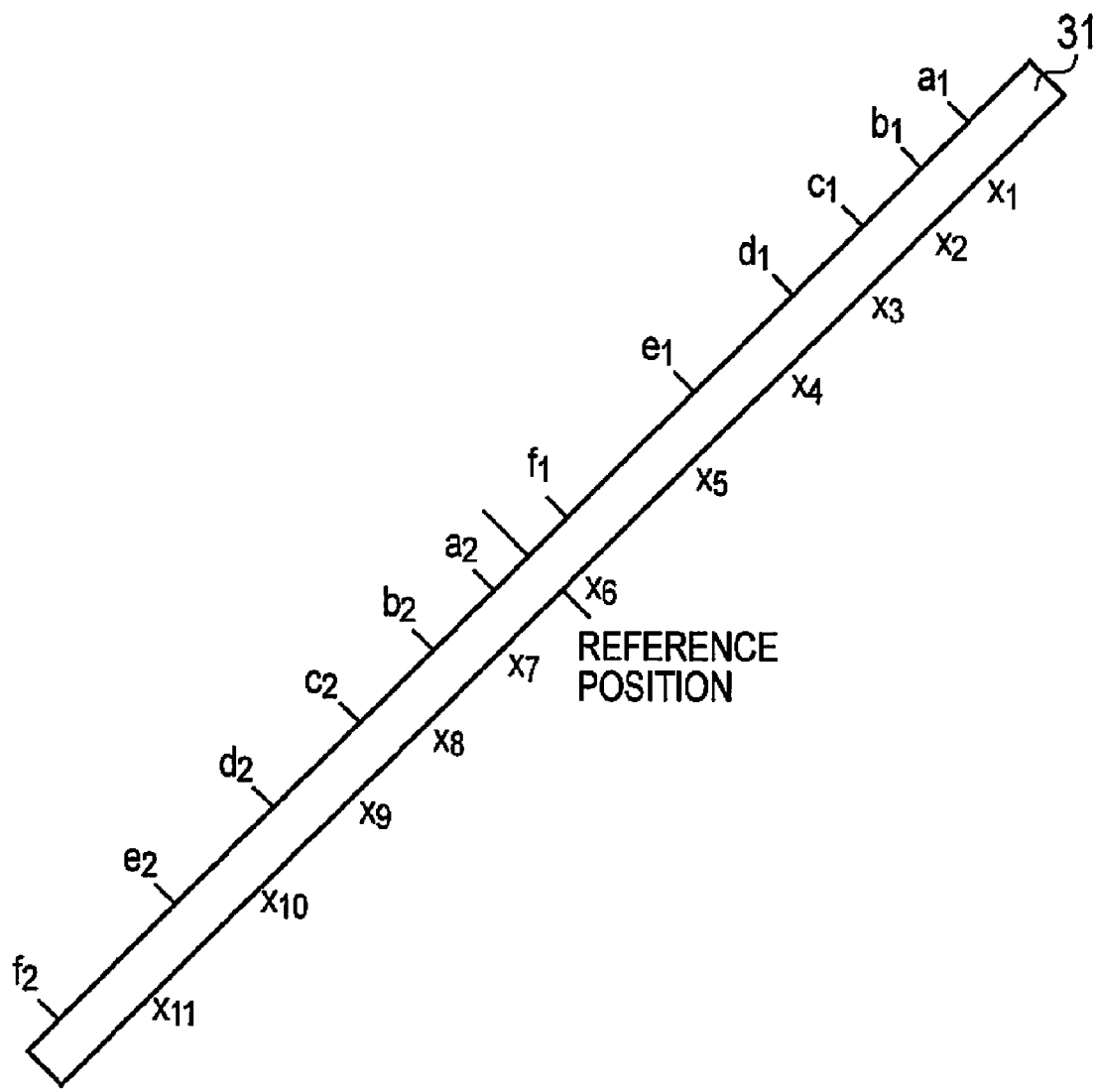
FIG. 3 is a diagram for explaining the dichroic mirror 31 according to the first embodiment.

Next, a light quantity distribution of a light beam entering the mirror surface 31a of the dichroic mirror 31 will be described with reference to FIG. 3.

Specifically, the light beam A emitted from the cell 20A is directed onto a region in a range from the position $a_1$ to the position $a_2$ on the mirror surface 31a. A light beam B emitted from the cell 20B is directed onto a region in a range from a position $b_1$ to a position $b_2$ on the mirror surface 31a. A light beam C emitted from the cell 20C is directed onto a region in a range from a position $c_1$ to a position $c_2$ on the mirror surface 31a. A light beam D emitted from the cell 20D is directed onto a region in a range from a position $d_1$ to a position $d_2$ on the mirror surface 31a. A light beam E emitted from the cell 20E is directed onto a region in a range from a position $e_1$ to a position $e_2$ on the mirror surface 31a. The light beam F emitted from the cell 20F is directed onto a region in a range from the position $f_1$ to the position $f_2$ on the mirror surface 31a.

Accordingly, only the light beam A enters a region $x_1$, that is, a region in the range from the position $a_1$ to the position $b_1$. In addition, the light beams A and B enter a region $x_2$, that is, a region in the range from the position $b_1$ to the position $c_1$. Moreover, the light beams A, B and C enter a region $x_3$, that is, a region in the range from the position $c_1$ to the position $d_1$. The light beams A, B, C and D enter a region $x_4$, that is, a region in the range from the position $d_1$ to the position $e_1$. Furthermore, the light beams A, B, C, D and E enter a region $x_5$, that is, a region in the range from the position $e_1$ to the position $f_1$. Moreover, the light beams A, B, C, D, E and F enter a region $x_6$, that is, a region in the range from the position $f_1$ to the position $a_2$. The light beams B, C, D, E and F enter a region $x_7$, that is, a region in the range from the position $a_2$ to the position $b_2$. Likewise, the light beams C, D, E and F enter a region $x_8$, that is, a region in the range from the position $b_2$ to the position $c_2$. The light beams D, E and F enter a region $x_9$, that is, a region in the range from the position $c_2$ to the position $d_2$. The light beams E and F enter a region $x_{10}$, that is, a region in the range from the position $d_2$ to the position $e_2$. Furthermore, only the light beam F enters a region $x_{11}$, that is, a region in the range from the position $e_2$ to the position $f_2$.

(Slant Setting Method 1)

Hereinafter, a description will be given of a slant setting method with reference to FIGS. 2 and 3. In this method 1, the cutoff wavelength reference value is monotonously changed for the entire surface of the mirror surface 31a. The terms and signs used herein are defined as follows.

(1) Cutoff Wavelength ($\lambda_p(\theta_x, x)$): The wavelength that determines whether a light beam including an incidence angle ($\theta_x$) at a position (x) should be transmitted or reflected.

(2) Cutoff Wavelength Reference Value ($\lambda_q(x)$): The wavelength that determines whether a light beam including a reference incidence angle (45°, for example) at a position (x) should be transmitted or reflected.

(3) Target Cutoff Wavelength ($\lambda_o$): The boundary wavelength between the waveband of a desired transmission light beam and the waveband of a desired reflection light beam.

(4) Reference Position: The position at which the cutoff wavelength reference value becomes the target cutoff wavelength in the mirror surface 31a.

(5) R(A) to R(F): The light quantity ratio of the light beams emitted from the cells A to F.

*R(A)+R(B)+R(C)+R(D)+R(E)+R(F)=1

(6) S(A) to S(F): The amount of slant from between ($a_1$–$a_2$) to between ($f_1$–$f_2$).

(7) SS: The amount of slant in the entire mirror surface 31a.

Here, the amount of slant (SS) is calculated based on the following formula (1):

[Equation 1]

$$SS = R(A) \times S(A) + R(B) \times S(B) + R(C) \times S(C) + R(D) \times S(D) + R(E) \times S(E) + R(F) \times S(F) \quad \text{Formula (1)}$$

Accordingly, the final cutoff wavelength reference value ($\lambda_q(x)$) is calculated based on the following formula, based on the distance from the reference position to each of the positions:

[Equation 2]

$\lambda_q(x) = SS \times L(x)$, where L(x) is the distance from the reference position to the position(x).

As described above, the longer the optical path length of the light beam emitted from the fly-eye lens unit 20 (the lamp light source unit 10) is, the larger the incidence angle of the light beam emitted from each of the plurality of cells becomes. Moreover, the larger the incidence angle than the reference incidence angle is, the closer the cutoff wavelength shifts to the short wavelength side is.

Accordingly, in a region where the optical path length of the light beam emitted from the lamp light source unit 10 is longer than the optical path length to the reference position, the cutoff wavelength reference value ($\lambda_q(x)$) is set to be a longer wavelength than the target cutoff wavelength. On the other hand, in a region where the optical path length of the light beam emitted from the lamp light source unit 10 is shorter than the optical path length to the reference position, the cutoff wavelength reference value ($\lambda_q(x)$) is set to be a shorter wavelength than the target cutoff wavelength.

Moreover, S(A) to S(F) are calculated as follows. Here, a description will be given for a calculation method for S(A), as an example. It should be noted that S(B) to S(F) can be also calculated by use of the same method.

Specifically, the amount of slant (S(A)) between ($a_1$–$a_2$) is calculated based on the following Formula (3):

[Equation 3]

$$S(A) = \lambda_{gap}(a)/L(a_1 - a_2) \quad \text{Formula (3), provided,}$$

$\lambda_{gap}(a)=\lambda_q(a_1)-\lambda_q(a_2)$, $L(a_1-a_2)$=distance between the position ($a_1$) and the position ($a_2$).

Here, a tentative cutoff wavelength reference value ($\lambda_q(a_1)$) is defined so that the cutoff wavelength ($\lambda_p(\theta a_1, a_1)$) becomes the target cutoff wavelength ($\lambda_o$). at the position ($a_1$). Likewise, a tentative cutoff wavelength reference value ($\lambda_q(a_2)$) is defined so that the cutoff wavelength ($\lambda_p(\theta a_2, a_2)$) becomes the target cutoff wavelength ($\lambda_o$) at the position ($a_2$).

As shown in FIG. 2, the incidence angle ($\theta a_1$) at the position ($a_1$) is larger than the incidence angle ($\theta a_2$) at the position ($a_2$). Accordingly, the cutoff wavelength ($\lambda_p(\theta a_1, a_1)$) at the position ($a_1$) shifts to a shorter wavelength side than the cutoff wavelength ($\lambda_p(\theta a_2, a_2)$) at the position ($a_2$). Therefore, the tentative cutoff wavelength reference value ($\lambda_q(a_1)$) at the position ($a_1$) is set to be a longer wavelength than the tentative cutoff wavelength reference value ($\lambda_q(a_2)$) at the position ($a_2$).

Here, when the incidence angle ($\theta x$) at each position (x) is larger than the reference incidence angle, the tentative cutoff wavelength reference value ($\lambda_q(x)$) is set to be a longer wavelength than the target cutoff wavelength ($\lambda_o$). On the other hand, when the incidence angle ($\theta x$) at each position (x) is smaller than the reference incidence angle, the tentative cutoff wavelength reference value ($\lambda_q(x)$) is set to be a shorter wavelength than the target cutoff wavelength ($\lambda_o$).

As described above, the tentative cutoff wavelength reference value ($\lambda_q(x)$) is determined so that the cutoff wavelength ($\lambda_p(\theta_x, x)$) depending on the incidence angle becomes the target cutoff wavelength ($\lambda_o$), for respective regions onto which the light beam emitted from each of the cells is directed. In addition, the amount of slant (S) of the tentative cutoff wavelength reference value ($\lambda_q(x)$) is calculated for the respective regions. Subsequently, by use of the amount of slant (S) calculated for the respective region, the amount of slant (SS) of the final cutoff wavelength reference value ($\lambda_q(x)$) is calculated.

(Slant Setting Method 2)

Hereinafter, a slant setting method 2 according to the first embodiment will be described with reference to the accompanying drawings. As described above, in the slant setting method 1, the cutoff wavelength reference value is monotonously changed in the entire mirror surface 31a. In contrast to this, in the slant setting method 2, after the mirror surface 31a is divided into a plurality of regions (a plurality of slant regions), the cutoff wavelength reference value is changed in each of the plurality of slant regions. It should be noted that the same definitions of the terms and signs as those used in the slant setting method 1 are used herein.

Figure 4A:
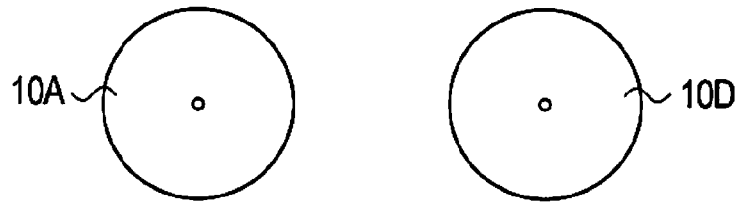
FIGS. 4A and 4B are diagrams for explaining a division of slant regions according to the first embodiment.

As shown in FIG. 4A, the lamp light source unit 10 is configured of four lamp light sources (lamps 10A to 10D) in the first embodiment. Accordingly, a position where the light quantity distribution is at its peak on the mirror surface 31a is a position apart from the optical axis of the light beam emitted from the lamp light source unit 10.

Figure 4B:
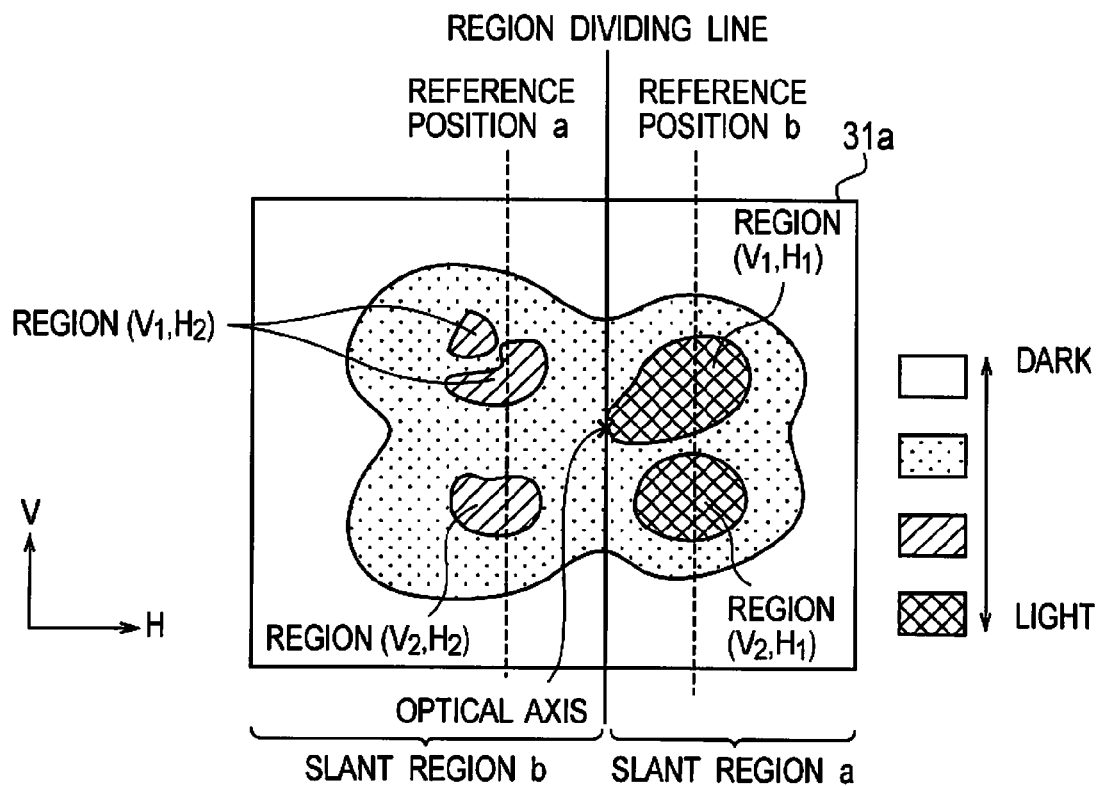

Specifically, as shown in FIG. 4B, on the mirror surface 31a, two regions across the optical axis in the V direction: (1. region ($V_1$, $H_1$)/region ($V_1$, $H_2$), 2. region ($V_2$, $H_1$)/region ($V_2$, $H_2$)) have a large light quantity. Likewise, two regions across the optical axis in the H direction: (1. region ($V_1$, $H_1$)/region ($V_2$, $H_1$), 2. region ($V_1$, $H_2$)/region ($V_2$, $H_2$)) also have a large light quantity.

Here, the H direction indicates the direction in which the incidence angle is changed based on the slant of the mirror surface 31a. The V direction indicates the direction orthogonal to the H direction and in which the incidence angle is not changed based on the slant of the mirror surface 31a.

It should be noted that the light quantity distribution shown in FIG. 4B is only an image of the light quantity distribution. Specifically, how the light beam emitted from each of the cells provided in the fly-eye lens unit 20 is distributed changes based on the distance between the fly-eye lens unit 20 and the dichroic mirror 31 and the distance between the dichroic mirror 31 and one of the plurality of liquid crystal panels 50. Accordingly, as a matter of course, a light quantity distribution on the mirror surface 31a may be different from the light quantity distribution shown in FIG. 4B.

According to the slant setting method 2 of the first embodiment, the mirror surface 31a is divided into two slant regions by a region dividing line passing through the optical axis and extending in the V direction. In other words, the mirror surface 31a is divided into a slant region a and a slant region b along the H direction.

The amounts of slants ($SS_a$ and $SS_b$) are calculated based on the same method as the aforementioned slant setting method 1 in the respective slant regions. It should be noted that the amount of slant ($SS_a$) indicates the amount of slant of the cutoff wavelength reference value in the slant region a, and the amount of slant ($SS_b$) indicates the amount of slant of the cutoff wavelength reference value in the slant region b.

The reference position a in the slant region a is preferably provided at a position where the light quantity distribution is at its peak in the slant region a. Likewise, the reference position b in the slant region b is preferably provided at a position where the light quantity distribution is at its peak in the slant region b.

The dichroic mirror 31 including the cutoff wavelength reference value set by use of the slant setting method 2 therein is located in a manner shown in FIG. 5. Specifically, the dichroic mirror 31 is located so that a plurality of slant regions is provided along the slant direction of the mirror surface 31a (the H direction).

As described, the mirror surface 31a includes the slant region a and the slant region b continuous with the slant region a. In each of the slant region a and the slant region b, the cutoff wavelength reference value, which determines a light beam including the reference incidence angle should be transmitted or reflected, is continuously changed between the short wavelength side of the target cutoff wavelength and the long wavelength side of the target cutoff wavelength. In addition, the cutoff wavelength reference value is discontinuous at the boundary between the slant region a and the slant region b.

(Operations and Effects)

According to the first embodiment, the mirror surface 31a of the dichroic mirror 31 is configured of a plurality of slant regions. In each of the slant regions, at a region where the optical path length of the light beam emitted from the lamp light source 10 is longer than the optical path length to the reference position, the cutoff wavelength reference value is set to be a longer wavelength, based on the distance from the reference position. On the other hand, at a region where the optical path length of the light beam emitted from the lamp light source 10 is shorter than the optical path length, the cutoff wavelength reference value is set to be a shorter wavelength, based on the distance from the reference position.

Accordingly, even when the light beam enters the mirror surface 31a of the dichroic mirror 31 at various incidence angles, the cutoff wavelength can be set close to the target cutoff wavelength at each position of the mirror surface 31a. Thereby, the color purities of a transmission light beam (here, the green component light G in particular) and a reflection light beam (here, the red component light R in particular) can be increased as compared with an optical element having the cutoff wavelength reference value changed monotonously in the entire mirror surface.

It should be noted that, as described above, the dichroic mirror 31 is provided at a position closer to the lamp light source 10 side than the dichroic mirror 32. Accordingly, on the dichroic mirror 31, a region where the light beams respectively emitted from the cells provided in the fly-eye lens unit 20 overlap with one another is smaller than that of the dichroic mirror 32.

Accordingly, it is more effective to configure the mirror surface 31a of the dichroic mirror 31 having a plurality of slant regions than to configure the mirror surface 32a of the dichroic mirror having a plurality of slant regions.

Second Embodiment

Hereinafter, a second embodiment of the present invention will be described with reference to the accompanying drawings. In the description below, differences between the first embodiment and the second embodiment will be mainly described.

Specifically, the lamp light source unit 10 is configured of four lamp light sources (the lamps 10A to 10D) in the first embodiment. In contrast to this, the lamp light source unit 10 is configured of five lamp light sources (lamps 10A to 10E) in the second embodiment. Further, the mirror surface 31a is divided into three slant regions (slant regions a to c) in the second embodiment.

(Configuration of Projection-type Image Display Device)

Figure 6:
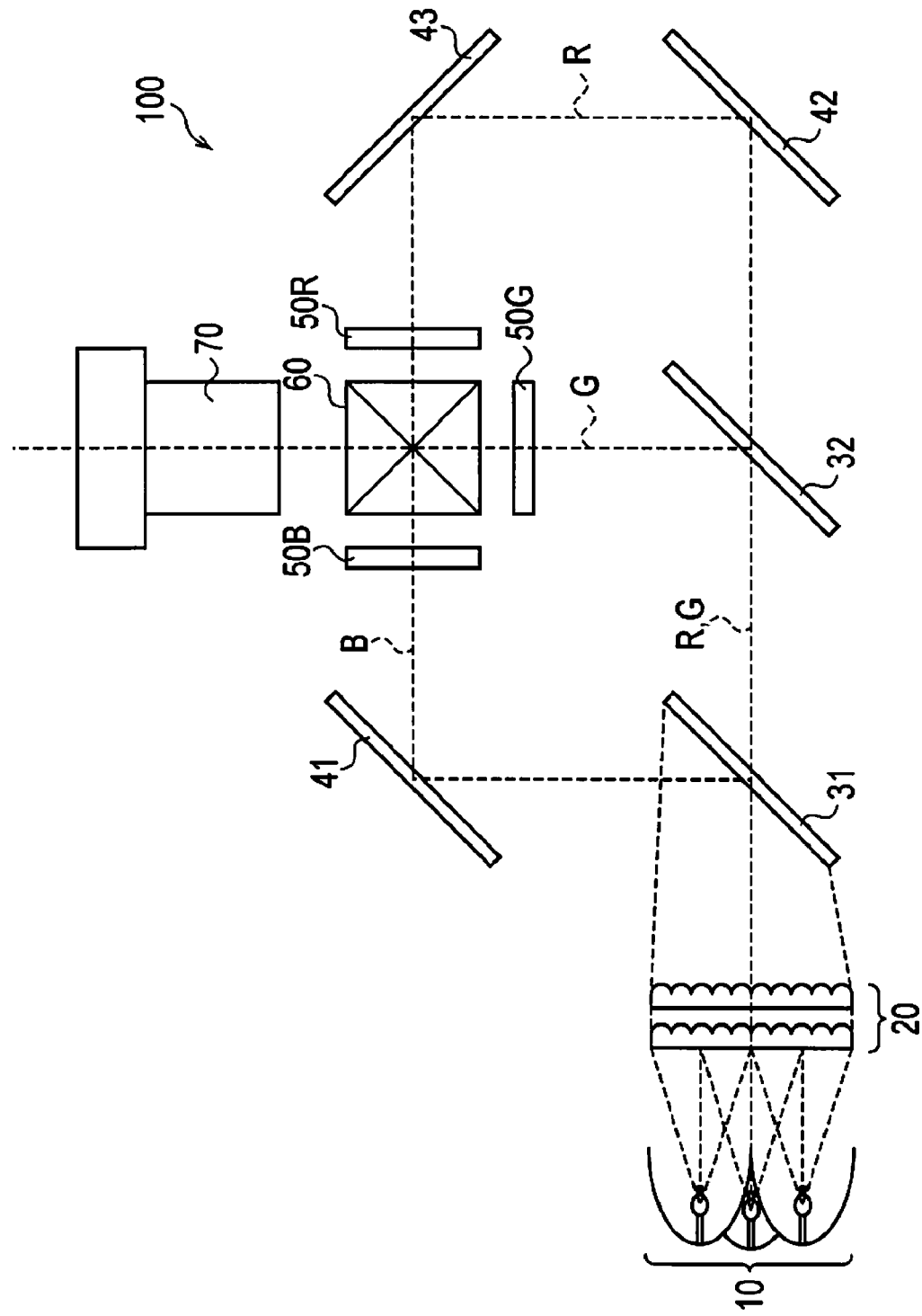
FIG. 6 is a diagram showing a configuration of a projection-type image display device 100 according to a second embodiment.

Hereinafter, a configuration of a projection-type image display device according to the second embodiment will be described with reference to the accompanying drawings. FIG. 6 is a diagram showing a projection-type image display device 100 according to the second embodiment. It should be noted that the same reference numerals as those in the configuration of FIG. 1 are used in FIG. 6.

As shown in FIG. 6, the lamp light source unit 10 is a UHP lamp or the like, which emits a white light beam, as described in the first embodiment. In the second embodiment, the lamp light source unit 10 is configured of five UHP lamps. Specifically, the projection-type image display device 100 is a multi-lamp type display device including a plurality of lamps.

(Slant Setting Method 2)

Hereinafter, a slant setting method 2 according to the second embodiment will be described with reference to the accompanying drawings.

Figure 7A:
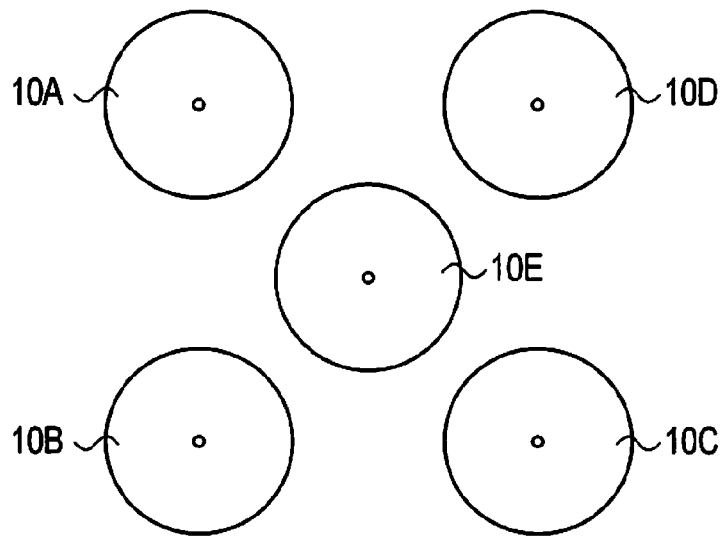
FIGS. 7A and 7B are diagrams for explaining for explaining a division of slant regions according to the second embodiment.

As shown in FIG. 7A, the lamp light source unit 10 is configured of the five lamp light sources (the lamps 10A to 10E) in the second embodiment. Accordingly, a position where the light quantity distribution is at its peak on the mirror surface 31a is a position apart from the optical axis of the light beam emitted from the lamp light source unit 10.

Figure 7B:
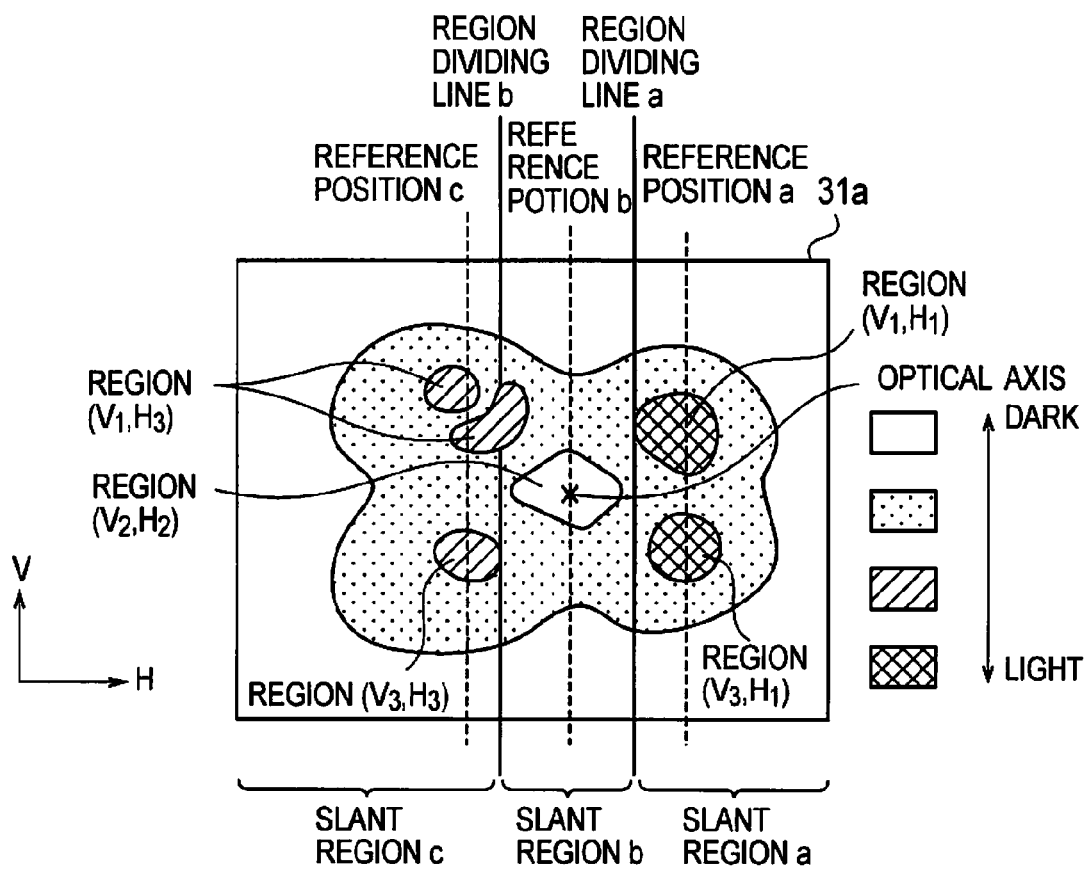

Specifically, as shown in FIG. 7B, on the mirror surface 31a, three regions across the optical axis in a V direction: (1. region $(V_1, H_1)$/region $(V_1, H_3)$, 2. region $(V_2, H_2)$, and 3. region $(V_3, H_1)$/region $(V_3, H_3)$) have a large light quantity. Likewise, three regions across the optical axis in an H direction: (1. region $(V_1, H_1)$/region $(V_3, H_1)$, 2. region $(V_2, H_2)$, and 3. region $(V_1, H_3)$/region $(V_3, H_3)$) have a large light quantity.

Here, the H direction indicates the direction in which the incidence angle is changed in accordance with the slant of the mirror surface 31a. The V direction indicates the direction orthogonal to the H direction and in which the incidence angle is not changed in accordance with the slant of the mirror surface 31a.

It should be noted that the light quantity distribution shown in FIG. 7B is only an image of the light quantity distribution. Specifically, how the light beam emitted from each of the cells provided in the fly-eye lens unit 20 is distributed changes based on the distance between the fly-eye lens unit 20 and the dichroic mirror 31, and the distance between the dichroic mirror 31 and one of the plurality of liquid crystal panels 50. Accordingly, as a matter of course, a light quantity distribution on the mirror surface 31a may be different from the light quantity distribution shown in FIG. 7B.

According to the slant setting method 2 in the second embodiment, the mirror surface 31a is divided into three regions by region dividing lines extending in the V direction (region dividing lines a and b). Specifically, the mirror surface 31a is divided into slant regions a, b and c along the H direction.

The amounts of slants ($SS_a$ to $SS_c$) are calculated based on the same method as the aforementioned slant setting method 1 respectively in the slant regions. It should be noted that the amounts of slants ($SS_a$ to $SS_c$) indicate the amounts of slants of the cutoff wavelength reference values in the slant regions a to c, respectively.

The reference position a in the slant region a is preferably provided at a position where the light quantity distribution is at its peak in the slant region a. Likewise, the reference position b in the slant region b is preferably provided at a position where the light quantity distribution is at its peak in the slant region b. In addition, the reference position c in the slant region c is preferably provided at a position where the light quantity distribution is at its peak in the slant region c.

The dichroic mirror 31 including the cutoff wavelength reference value set by use of the slant setting method 2 therein is located in a manner shown in FIG. 8. Specifically, the dichroic mirror 31 is located so that a plurality of slant regions is provided along the slant direction of the mirror surface 31a (the H direction).

(Operations and Effects)

According to the second embodiment, the number of the slant regions and shape of slant regions is defined by the configuration of the lamp light source unit 10, i.e., the light quantity distribution on the mirror surface 31a. Accordingly, the color purities of the transmission light beam and the reflection light beam can be further increased.

Other Embodiments

The present invention has been described with the foregoing embodiments. However, the descriptions and drawings constituting part of this disclosure shall not be construed as imposing any limitation on the present invention. From this disclosure, various alternative embodiments, examples and operating techniques will be clear to those skilled in the art.

Figure 9:
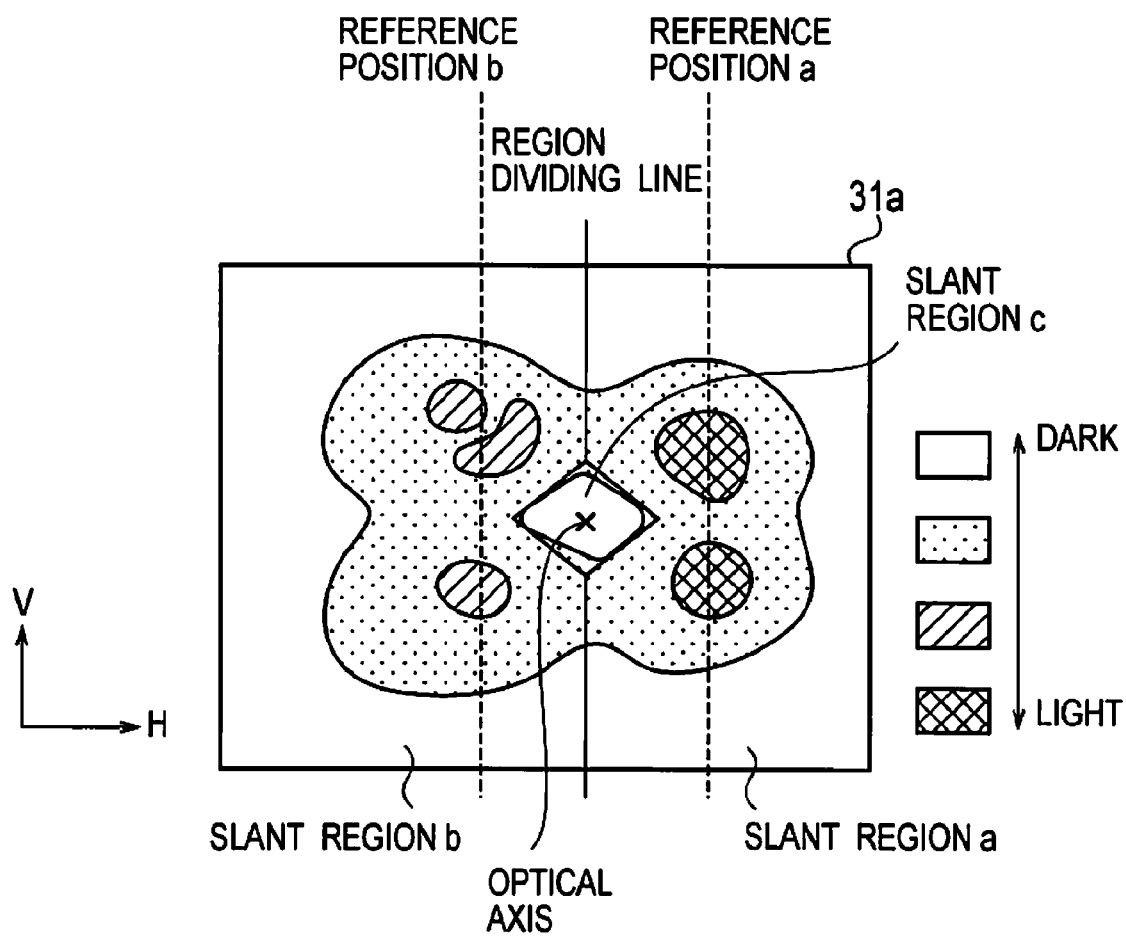
FIG. 9 is a diagram for explaining a division of slant regions according to other embodiments.

For example, the three slant regions are provided along the slant direction (the H direction) of the mirror surface 31a in the aforementioned second embodiment. However, the present invention is not limited to this. To be more specific, as shown in FIG. 9, when the lamp light source unit 10 is configured of five lamp light sources, the mirror surface 31a may be divided into three slant regions (slant regions a to c) by a division region line surrounding the aforementioned region $(V_2, H_2)$ and extending in the V direction. Incidentally, the light quantity distribution shown in FIG. 9 is the same as that shown in FIG. 7B.

As a matter of course, the slant setting method 2 is applicable to the dichroic mirror 32 that separates the red component light beam R and the green component light beam G. The color purities of the transmission light beam (the red component light beam R) and the reflection light beam (the green component light beam G) can be thereby increased.

In an optical system using an yellow component light beam Ye, which includes a wavelength band between the wavelength band of the red component light beam R and the wavelength band of the green component light beam G, it is effective to use an optical element (a dichroic mirror) to which the slant setting method 2 is applied.

In the aforementioned embodiments, the number of the slant regions and the shape of slant regions are shown as examples only. The number of the slant regions and the shape of slant regions are preferably determined based on the light quantity distribution on a mirror surface of an optical element. The reference position provided in each of the slant regions is preferably determined based on the light quantity distribution of each of the slant regions.

Here, the light quantity distribution on a mirror surface of an optical element depends on the number of or the layout of the plurality of lamp light sources constituting the lamp light source unit 10. Accordingly, the number of the slant regions and shape of slant regions are preferably determined based on the number of the slant regions or the layout of the plurality of lamp light sources constituting the lamp light source unit 10.

In the aforementioned embodiment, a description has been given for an example in which the optical element to which the slant setting method 2 is applied as a color separator separating the color component light beams. However, the present invention is not limited to this. Specifically, the optical element to which the slant setting method 2 is applied may be used as a color combining element combining the color component light beams.

In the aforementioned embodiment, a description has been given for an example in which the optical element to which the slant setting method 2 is applied is used in a projection-type image display device. However, the present invention is not limited to this. Specifically, the optical element to which the slant setting method 2 is applied may be used as a color separator or a color combining element provided in an apparatus (such as a 3CCD imaging device).

Although it is not particularly mentioned in the aforementioned embodiments, a method of forming an optical element (a mirror surface) in which the amount of slant of a cutoff wavelength reference value is changed is not limited to a particular one. For example, such an optical element (a mirror surface) can be formed by a vacuum evaporation method. Further, in the optical element (the mirror surface) according to the slant setting method 2, the mirror surface can be formed by masking a part of a slant region, when forming the slant region.

What is claimed is:

1. An optical element, comprising a mirror surface configured to transmit a part of an incident light beam therethrough and to reflect the other part of the incident light beam, wherein
a target cutoff wavelength, which indicates a boundary wavelength between a wavelength band of a desired transmission light beam and a wavelength band of a desired reflection light beam, is defined,
the mirror surface includes at least a first region and a second region,
each of the first region and the second region includes a reference position at which a cutoff wavelength reference value, which defines whether a light beam having a reference incidence angle should be transmitted or reflected, indicates the target cutoff wavelength, and
in each of the first region and the second region, the cutoff wavelength reference value at a certain position is set to be a shorter wavelength or a longer wavelength than the target cutoff wavelength, based on a distance from the reference position to the certain position.

2. A projection-type image display device, comprising:
a lamp light source unit; and
an optical element configured to separate a light beam emitted from the lamp light source unit, wherein
the optical element includes a mirror surface configured to transmit a part of an incident light beam therethrough and to reflect the other part of the incident light beam,
a target cutoff wavelength, which indicates a boundary wavelength between a wavelength band of a desired transmission light beam and a wavelength band of a desired reflection light beam, is defined in the optical element,
the mirror surface has a slant with respect to an optical axis of the light beam emitted from the lamp light source, and includes at least a first region and a second region,
each of the first region and the second region includes a reference position at which a cutoff wavelength reference value, which defines whether a light beam having a reference incidence angle should be transmitted or reflected, indicates the target cutoff wavelength,
in each of the first region and the second region, the cutoff wavelength reference value at a certain position is set based on a distance from the reference position to the certain position, and
in each of the first region and the second region, the cutoff wavelength reference value is set to be a longer wavelength than the target cutoff wavelength in a region where an optical path length emitted from the lamp light source is longer than the optical path length to the reference position, and the cutoff wavelength reference value is set to be a shorter wavelength than the target cutoff wavelength in a region where the optical path length of the light beam emitted from the lamp light source is shorter than the optical path length to the reference position.

3. The projection-type image display device according to claim 2, wherein
the first region and the second region are defined based on a light quantity distribution of the light beam entering the mirror surface.

4. The projection-type image display device according to claim 3, wherein
the lamp light source unit includes a plurality of lamp light sources, and
the first region and the second region are defined based on a layout of the plurality of lamp light sources.

5. The projection-type image display device according to claim 2, wherein
in each of the first region and the second region, the reference position is defined based on a light quantity distribution of a light beam entering each of the first region and the second region.

6. An optical element, comprising a mirror surface configured to transmit a part of an incident light beam therethrough and to reflect the other part of the incident light beam, wherein
the mirror surface includes at least a first region and a second region, the second region being continuous with the first region,
in each of the first region and the second region, a cutoff wavelength reference value is continuously changed between a short wavelength side of a target cutoff wavelength and a long wavelength side of the target cutoff wavelength, the cutoff wavelength reference value defines whether a light beam having a reference incidence angle should be transmitted or reflected, and the cutoff wavelength reference value is discontinuous at a boundary between the first region and the second region.

7. A projection-type image display device, comprising:

a lamp light source unit; and an optical element configured to separate a light beam emitted from the lamp light source unit, wherein the optical element includes a mirror surface configured to transmit a part of an incident light beam therethrough and to reflect the other part of the incident light beam, the mirror surface has a slant with respect to an optical axis of the light beam emitted from the lamp light source unit, and includes at least a first region and a second region, the second region being continuous with the first region, in each of the first region and the second region, a cutoff wavelength reference value is continuously changed between a short wavelength side of a target cutoff wavelength and a long wavelength side of the target cutoff wavelength, the cutoff wavelength reference value defines whether a light beam having a reference incidence angle should be transmitted or reflected, and the cutoff wavelength reference value is discontinuous at a boundary between the first region and the second region.

\* \* \* \* \*